(12) United States Patent
Liva

(10) Patent No.: US 9,014,208 B2
(45) Date of Patent: Apr. 21, 2015

(54) METHOD OF TRANSMITTING DATA

(75) Inventor: Gianluigi Liva, Munich (DE)

(73) Assignee: Deutsches Zentrum fur Luft- und Raumfahrt E.V., Cologne (DE)

(*) Notice: Subject to any disclaimer, the term of this patent is extended or adjusted under 35 U.S.C. 154(b) by 1208 days.

(21) Appl. No.: 12/615,697

(22) Filed: Nov. 10, 2009

(65) Prior Publication Data

US 2010/0124222 A1   May 20, 2010

(30) Foreign Application Priority Data

Nov. 14, 2008   (EP) ..................................... 08169112

(51) Int. Cl.
    *H04L 12/413*   (2006.01)
    *H04W 74/08*    (2009.01)
(52) U.S. Cl.
    CPC ............ *H04W 74/08* (2013.01); *H04W 74/085* (2013.01); *H04W 74/0833* (2013.01); *H04W 74/0841* (2013.01); *H04L 12/413* (2013.01)
(58) Field of Classification Search
    None
    See application file for complete search history.

(56) References Cited

U.S. PATENT DOCUMENTS

2006/0171418 A1   8/2006  Casini et al.

OTHER PUBLICATIONS

Choudhury et al., Diversity ALOHA—A Random Access Scheme for Satellite Communications, Mar. 1983.*
Richardson et al., Design of capacity-Approaching Irregular Low-Density Parity Check Codes, Feb. 2001.*
Differentiated Quality of Service Slotted ALOHA, Doug Dillon, Engineering HNS, Inc., 0-7803-8784-0/ $20.00 (c) 2004 IEEE, pp. 343-346.
Contention Resolution Diversity Slotted ALOHA (CRDSA): An Enhanced Random Access Scheme for Satellite Access Packet Networks, Enrico Casini et al., 1536-1276/07$25.00 (C) 2007 IEEE, IEEE Transactions on Wireless Communications, vol. 6, No. 4, Apr. 2007, pp. 1408-1419.

* cited by examiner

*Primary Examiner* — John Blanton
*Assistant Examiner* — Aixa A Guadalupe-Cruz
(74) *Attorney, Agent, or Firm* — Clements Bernard PLLC; Gregory N. Clements

(57) ABSTRACT

The invention is related to a method of transmitting data whereby a transmission channel towards an access point (10) is shared among a plurality of users (12), the data being transmitted using the Contention Resolution Diversity Slotted ALOHA (CRDSA) method. According to the invention the number of copies (14a,14b, 14c; 16a, 16b, 16c; 18a,18b, 18c) of data packet (14, 16, 18) transmitted simultaneously by a user (12) within one frame is varied.

11 Claims, 12 Drawing Sheets

METHOD OF TRANSMITTING DATA

FIELD OF THE INVENTION

The invention is related to a method of transmitting data to an access point over a transmission channel which is shared among a plurality of users.

BACKGROUND

A known method for such a transmission of data is the Contention Resolution Diversity Slotted ALOHA (CRDSA) method. This method could for instance be used in the case of digital packetized uplink from many grounds stations towards a satellite. If we assume that there is no coordination between the users, i.e., the users may transmit their data packets on the same carrier frequency and in the same time instant and if we further assume that there is no Code Division Multiple Access (CDMA) it is obvious that packets sent by various users may collide on the communication medium, meaning that they will create interference among each other. The Slotted ALOHA method is a known protocol aiming to manage such uncoordinated multiple access schemes. In the Slotted ALOHA method the time access is partitioned in frames of duration Tf. Each frame is further partitioned in Ns slots of duration Ts=Tf/Ns. Each user must align his packet transmission to a slot, i.e., a synchronization with the frame structure must be kept by each user. Each user then transmits data independently with respect to the others and awaits for an acknowledgement form the gateway, which is the common access point. If no acknowledgement is received meaning that a collision has taken place on the communication medium, the user retransmits his packet with a random delay. This procedure is repeated until the packet transmission is successful. The concept of the Slotted ALOHA method is shown in FIGS. 1 and 2.

The throughput achieved by the Slotted ALOHA method is defined as $T(G)=Ge^{-G}$. The peak throughput for the Slotted ALOHA method is achieved at G=1, for which T≃0.3679. This means that if G=1 the fraction of packets which will be transmitted successfully in a transmission attempt will be about 36%. G is defined as G=m/n, whereby m is the number of packet transmission attempts per frame and n is the number of slots per frame. The throughput which can be achieved with the Slotted ALOHA method as a function of the offered traffic G is shown in FIG. 3.

SUMMARY OF THE INVENTION

As an improvement of the Slotted ALOHA method the Contention Resolution Diversity Slotted ALOHA (CRDSA) method has been developed. Hereby each user transmits two copies of the same packet within a frame in two randomly selected slots. In the header of each packet a pointer to the position of the twin packet is written. If one packet is received without collision by the gateway or access point the pointer can be extracted from the header and is used by the gateway to identify where the twin packet is located in the frame structure. In case the twin packet collided with another packet, an interference cancellation process takes place with the following steps:

The waveform representation of the twin packet is reconstructed at the gateway, by decoding the correctly received packet, re-encoding it, and modulating it.

The so-obtained waveform is subtracted from the received signal within the time slot of the twin copy. This is equivalent to canceling the interference caused by the twin packet to the packet colliding in the same slot.

The collided packet in this slot can now be decoded.

This process can be iterated, meaning that the recovery of the collided packet will provide a pointer to the twin packet of the collided one. Thus by using this cascade effect, many packets can be recovered by this interference cancellation procedure.

This procedure is depicted in FIGS. 4 and 5 whereby FIG. 4 shows that user 1 sends two copies of a packet. One copy leads to a collision while the other one is correctly received by the gateway which sends the acknowledgement. The same happens for the packets sent by user 3. Both packets which have been sent by user 2 are lost due to collisions. As it is shown in FIG. 5 the interference caused by the packet sent by user 1 on the packet of user 2 in the forth time slot is cancelled. This permits to recover the packet of user 2. As an alternative the interference caused by user 3 to user 2 may be cancelled by a subtraction as described above.

Simulation results provided in "E. Casini, R. D. Gaudenzi, and O. D. R. Herrero,—Contention resolution diversity slotted aloha (crdsa): An enhanced random access scheme for satellite access packet networks.—IEEE Transactions on Wireless Communications, vol. 6, pp. 1408-1419, April 2007" show that almost in the whole range G∈[0.1] the CRDSA method provides a larger throughput, with a peak of T≃0.55 for G≃0.65. This is shown in FIG. 6. As can be further seen the limit for which the normalized throughput is almost linear is extended from G=0.1 for Slotted ALOHA to G=0.4 for CRDSA, meaning that for loads lower than G=0.4 almost all the transmission attempts are successful.

Although the CRDSA method has significantly improved the Slotted ALOHA method the peak throughput is quite far from the maximum possible value of T=1.

It is an object of the present invention to improve the throughput in a method of transmitting data, whereby a transmission channel toward an access point is shared among a plurality of users.

This object is achieved by the features of method claim 1.

DETAILED DESCRIPTION OF THE INVENTION

In a method of transmitting data a common transmission channel towards an access point is shared among a plurality of users. The data is transmitted using the Contention Resolution Diversity Slotted ALOHA method. According to the invention the number of copies of a data packet which are transmitted simultaneously by a user within one frame is varied. This means in particular that the number of copies can be 1 (as in the Slotted ALOHA method), 2 (as in the CRDSA method) or higher than 2. The method according to the invention allows to achieve a significant improvement for the throughput T especially if the number of copies of a data packet is chosen correctly. As it will be explained further below with the above mentioned method it is possible to achieve a throughput peak of T≃0.78 and further achieve an almost linear increase of T until G≃0.8, meaning that even when the system is 80% loaded the probability of transmission success is for each user almost equal to 1.

In a preferred embodiment of the method according to the invention the Slotted ALOHA method is used instead of the CRDSA method when the traffic is G>1, in particular G>0.92, whereby G is the number of packet transmission attempts (m) per frame divided by the number of slots (n) per frame. This means for example that whenever a user detects a number of n consecutive collisions, the user switches to the standard Slotted ALOHA method, meaning in other words that $\Lambda_1$ is set to 1, whereby $\Lambda_1$ is the probability of generating 1 copy of a data packet. While for values of G that are below a threshold G* which will be explained later, the advantage of the CRDSA method (both in its original regular setting with two copies of each data packet and in the "irregular setting" according to the invention with a varying number of copies) with respect to the Slotted ALOHA method is evident, at higher values of G the Slotted ALOHA method performs better. For G>G* the iterative recovery of data packets works well and most of the collisions are resolved. As G>G* the interference cancellation process gets stuck in an early stage, when the number of copies of data packets within the frame is much larger than the number of data packets in the Slotted ALOHA scheme resulting in a high data packet loss probability. Further details with regard to the above mentioned calculations will be explained below.

It is particularly preferred that the Slotted ALOHA method is used instead of the CRDSA method when the traffic is G>G* whereby G* is the traffic value for which the throughput of the CRDSA method is lower than the throughput of the Slotted ALOHA method. Hereby G* depends on the probability distribution in use.

It is particularly preferred that the number of copies of a data packet within one frame is varied separately for each data packet. This can be accomplished for example by varying the number of copies of a data packet according to a given probability distribution $\Lambda_d$ whereby $\Lambda_d$ is the probability of generating d copies of a data packet within one frame. For example $\Lambda_2$ can be 0.5, $\Lambda_3$ can be 0.28 and $\Lambda_8$ can be 0.22. This means that two copies of a data packet will be generated with a probability of 0.5, three copies will be generated with a probability of 0.28 and eight copies will be generated with a probability of 0.22. For a large number of transmission attempts m per frame the number of copies will get closer to the given probability distribution whereby for m=∞ the number of copies corresponds to the probability distribution.

A probability distribution is used in order to avoid necessity for coordination among the users, which would mean for example for the case that too many users have generated three copies of data packets all other users should change their rate for the future in order to avoid further generation of triple copies. Since requiring communication or coordination among the users is not practical the above mentioned probability distribution can be used in the following way:

A user generates a uniform random number Z in the interval [0.1]. Z is compared with a first threshold of 0.5. If Z>0.5, two copies of a data packet are generated. Otherwise Z is compared to a second threshold given by 0.5+0.28=0.78. If Z>0.78, three copies of a data packet are generated. Otherwise eight copies will be generated. Thus the statistical average is given by the probability distribution although it may happen in a specific frame in particular for a low number of m that the distribution of the number of copies deviates from the given probability distribution.

Preferably the probability that d data packets are transmitted in the same slot is defined as $\psi_d$ whereby $\psi_d$ particularly depends from G and $\Lambda_d$.

It is particularly preferred that the CRDSA method with a varying number of data packets within one frame is applied iteratively, iteration taking place preferably 10, 20, 100 or 1000 times.

It is further preferred that the number of slots n per frame is 50, 200 or preferably 1000.

In a particularly preferred embodiment the averaged number of copies of a data packet is 3.6.

Since it is evident that systems working according to the CRDSA method require in the average more power than systems using the Slotted ALOHA method it is preferred to shorten the burst duration of a data packet in the time domain when the Slotted ALOHA method is used. The burst duration is defined by the length of the time which is occupied by a slot within one frame. Thus the shortening of the burst duration leads to an increased number of slots within one frame. For example the number of slots per frame for d>2 which is defined as $n_{irr}$ can be 200, whereby the number of slots per frame for the Slotted ALOHA method can be $n_1$=340 and the number of slots per frame for the CRDSA method with n=2 can be $n_2$=261.

An independent invention is related to a method of transmitting data whereby a transmission channel towards an access point is shared among a plurality of users, the data being transmitted using the CRDSA method, whereby the Slotted ALOHA method is used instead of the CRDSA method when the traffic is G>1, or G>G* whereby G is the number of packets transmission attempts m per frame divided by the number of slots n per frame. In this method according to the invention it is not necessary to vary the number of copies of a data packet transmitted simultaneously by a user within one frame. This method according to the independent invention can comprise all the features, which have been described in connection with the first invention.

BRIEF DESCRIPTION OF THE DRAWINGS

Preferred embodiments of the invention will be described in connection with the following figures.

The figures show:

FIGS. 1 to 6 have been described in connection with the known state of the art.

The curve IRR3 corresponds to a probability distribution of
$\Lambda_2=0.5702118138172$, $\Lambda_3=0.19852126851313$,
$\Lambda_5=0.10171996678689$, $\Lambda_6=0.047473717832445$,
$\Lambda_{12}=0.058521647558462$, $\Lambda_{32}=0.008889772097\,3547$,
$\Lambda_{33}=0.0146618133945514$.

The three proposed probability distributions provide throughput peaks close to 0.78 and the relation between throughput T and traffic G is almost linear up to traffics close to 0.8, meaning that, even when the system is 80% loaded, the probability of transmission success is for each user almost equal to 1. Further preferred embodiments of the invention and mathematical background are depicted in the following description. Thereby the following abbreviations are used: MAC (Multiple Access), SA (Slotted ALOHA) and IC (Interference Cancellation). Further the transmission of a packet within a slot is described as a "burst". The term copy is interchangeably used with the term replica with regard to the number of copies, which is varied according to the invention.

First a graph representation of the iterative burst recovery of the state of the art document Casini et al. mentioned in the introduction of the application is explained. It will be shown that, under the assumption of ideal channel estimation, a further enhancement can be achieved by varying the number of copies for each burst. The repetition rate is selected by the user according to a probability distribution, from which the system performance will depend. A means for analyzing the iterative IC convergence will be provided as a function of such a probability distribution, which is inspired by similar analysis of the iterative decoding convergence of sparse-graph codes on erasure channels as described in "M. Luby, M. Mitzenmacher, and A. Shokrollahi,—Analysis of random processes via and-or tree evaluation—in Proc. $9^{th}$ Annual ACM-SIAM Symposium on Discrete Algorithms, 1998, pp. 364-373" and "T. J. Richardson, M. A. Shokrollahi, and R. L. Urbanke,—Design of capacity-approaching irregular low-density parity-check Codes—IEEE Transactions on Information Theory, vol. 47, no. 2, pp. 619-637 February 2001".

Numerical results confirm the validity of this approach which achieves higher throughputs (close to 0.9) with respect to the state of the art document Casini et al.

In the following a graph representation of the iterative IC process is explained.

In this section a generalization of the concept of Casini et al. will be introduced. The generalization works as follows. For each burst, the user adopts a (variable) retransmission rate, which is picked according to a given distribution $\{\Lambda_d\}$. Consider, as an example the case where the distribution is given by $\Lambda_2=0.6$, $\Lambda_4=0.4$. In this case a burst will be repeated twice with probability 0.6, and four times with probability 0.4.

Figure 1:
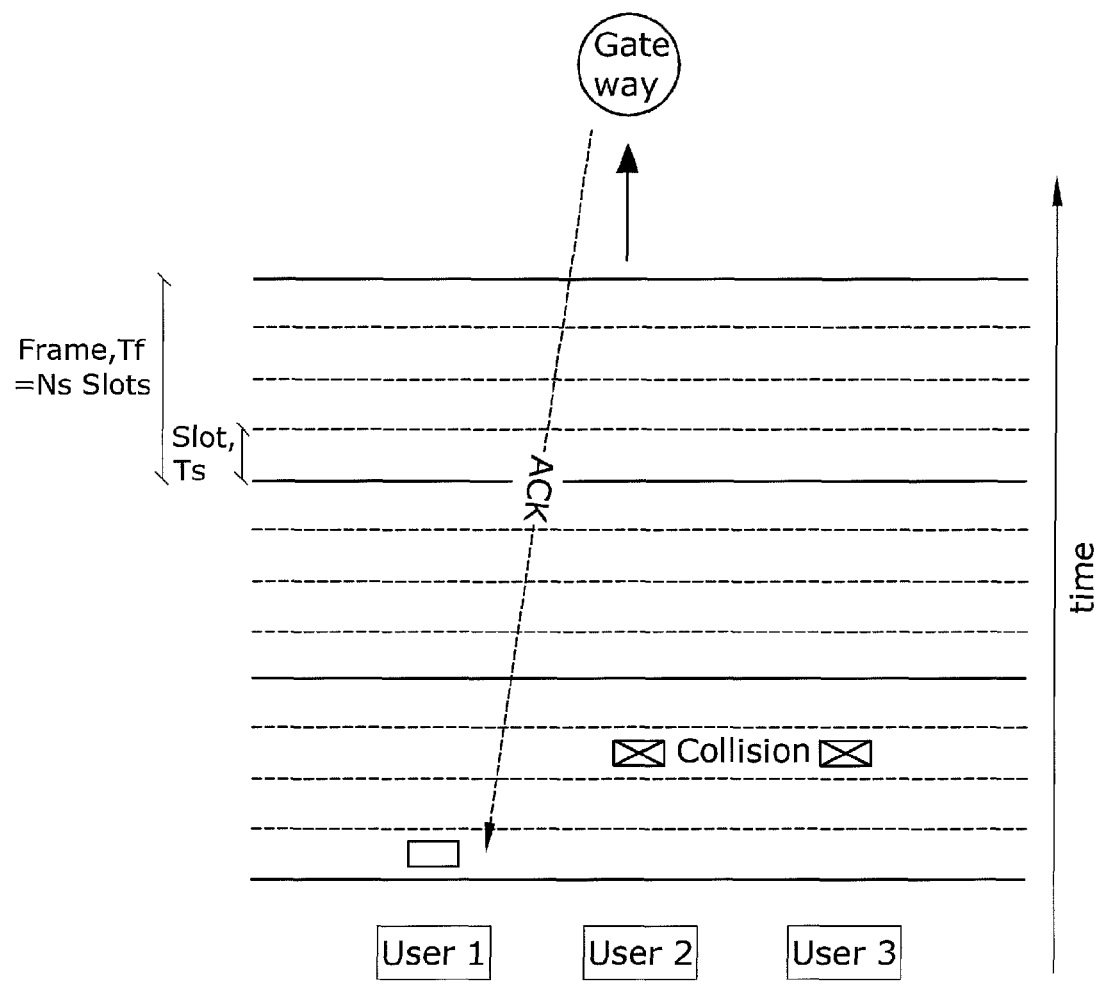
FIGS. 1 and 2 the process of the Slotted ALOHA method according to the state of the art, FIG. 3 the throughput T in the Slotted ALOHA method.
Figure 2:
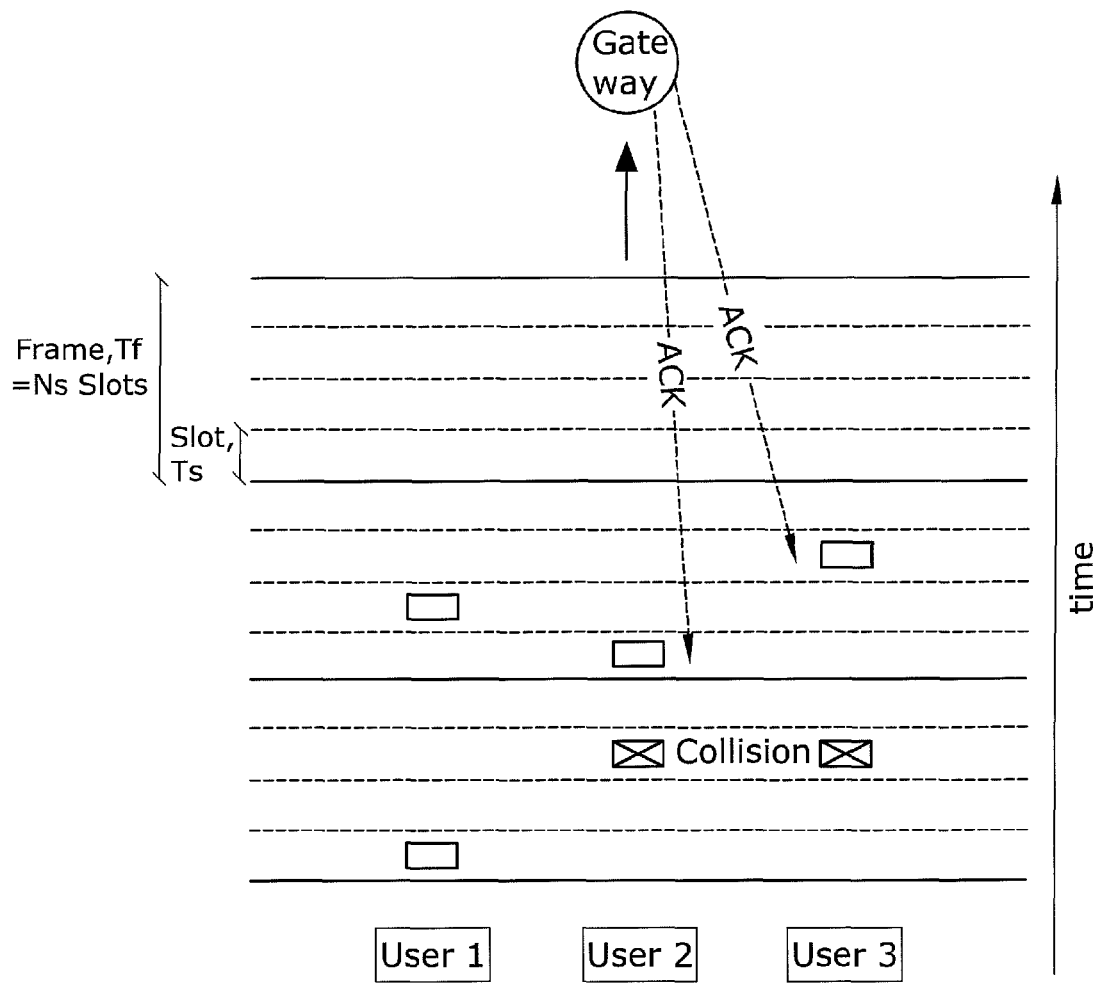
Figure 3:
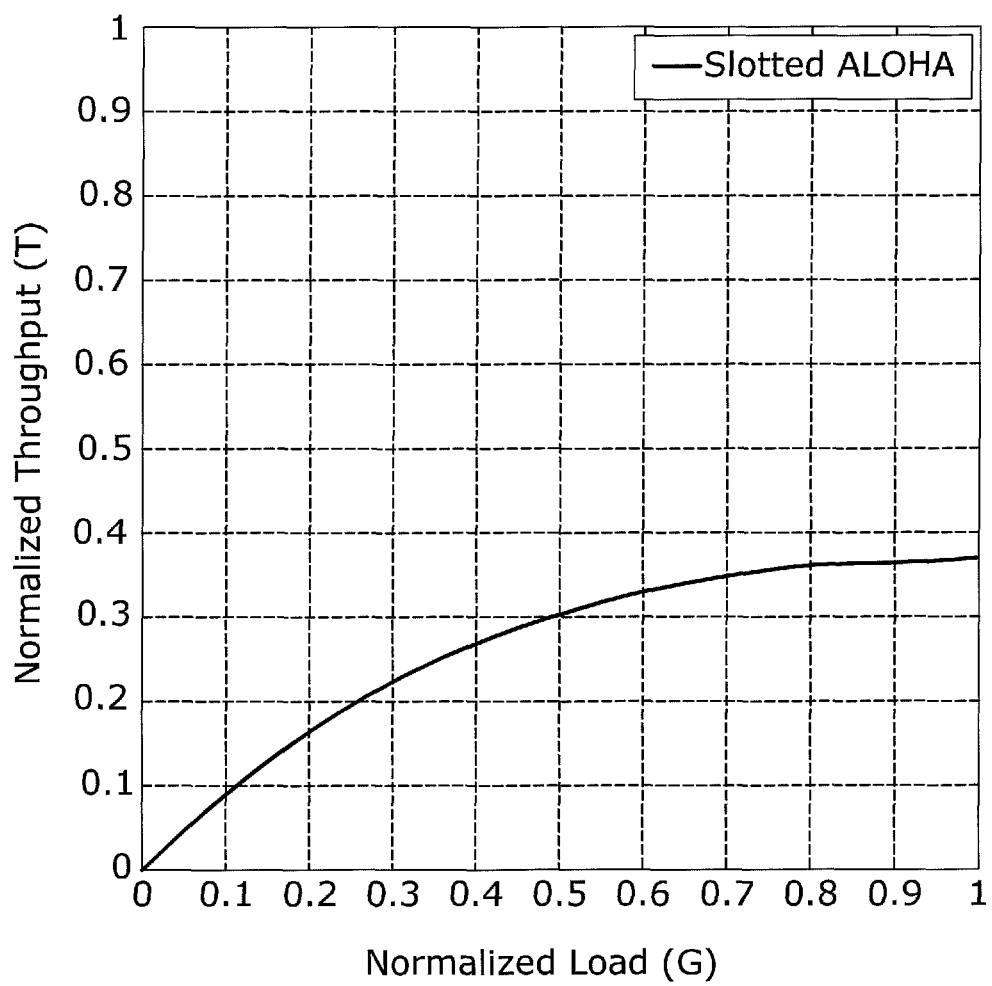
Figure 4:
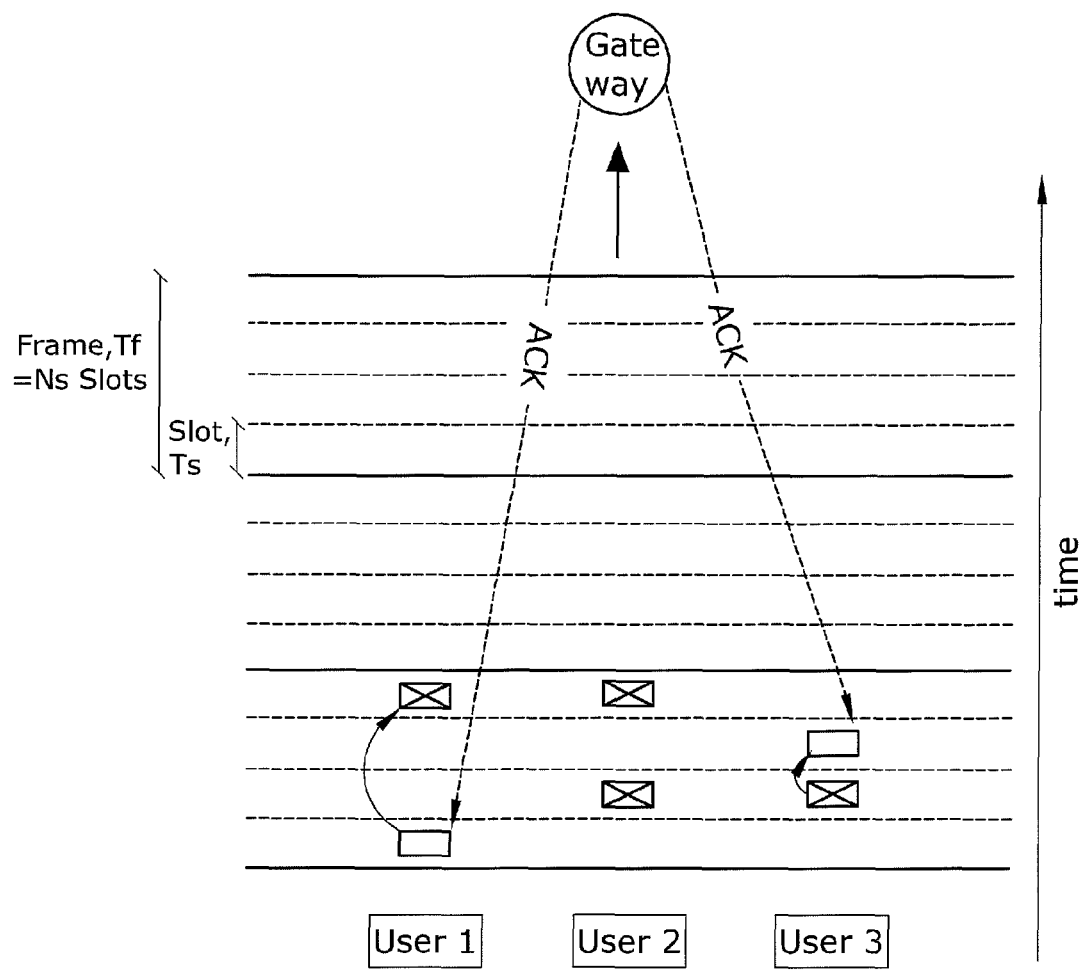
FIGS. 4 and 5 the process of the CRDSA method according to the state of the art, FIG. 6 the throughput T of the CRDSA method compared to the throughput T of the Slotted ALOHA method, FIG. 7 the throughput T of the method according to the invention compared to the Slotted ALOHA and CRDSA method, FIGS. 8a, b, c, d, e, f an example of a graph representation for the interference cancellation process, FIG. 9 asymptotic performance for SA, CRDSA, and for CRDSA with the irregular distribution $\Lambda_1$ (x), FIG. 10 simulated and asymptotic performance for SA, CRDSA, and for CRDSA with the irregular distribution $\Lambda_1$ (x); n=200, FIG. 11 simulated and asymptotic performance for SA and for CRDSA with the irregular distribution $\Lambda_1$ (x) with varying MAC frame sizes; $I_{max}$=20 and FIG. 12 simulated performance of various schemes vs. the absolute load, when assuming equal transmission power $n_{irr}$=200.
Figure 5:
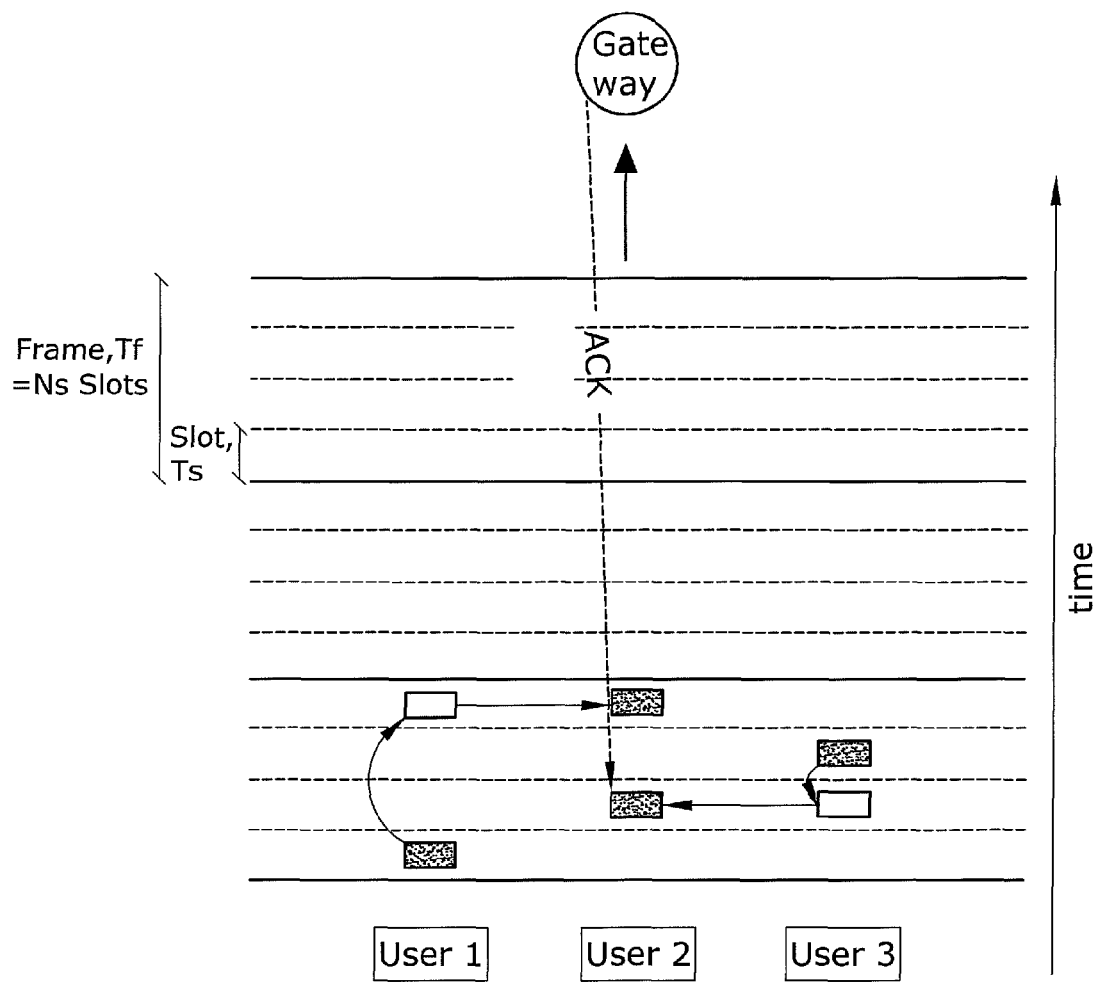
Figure 6:
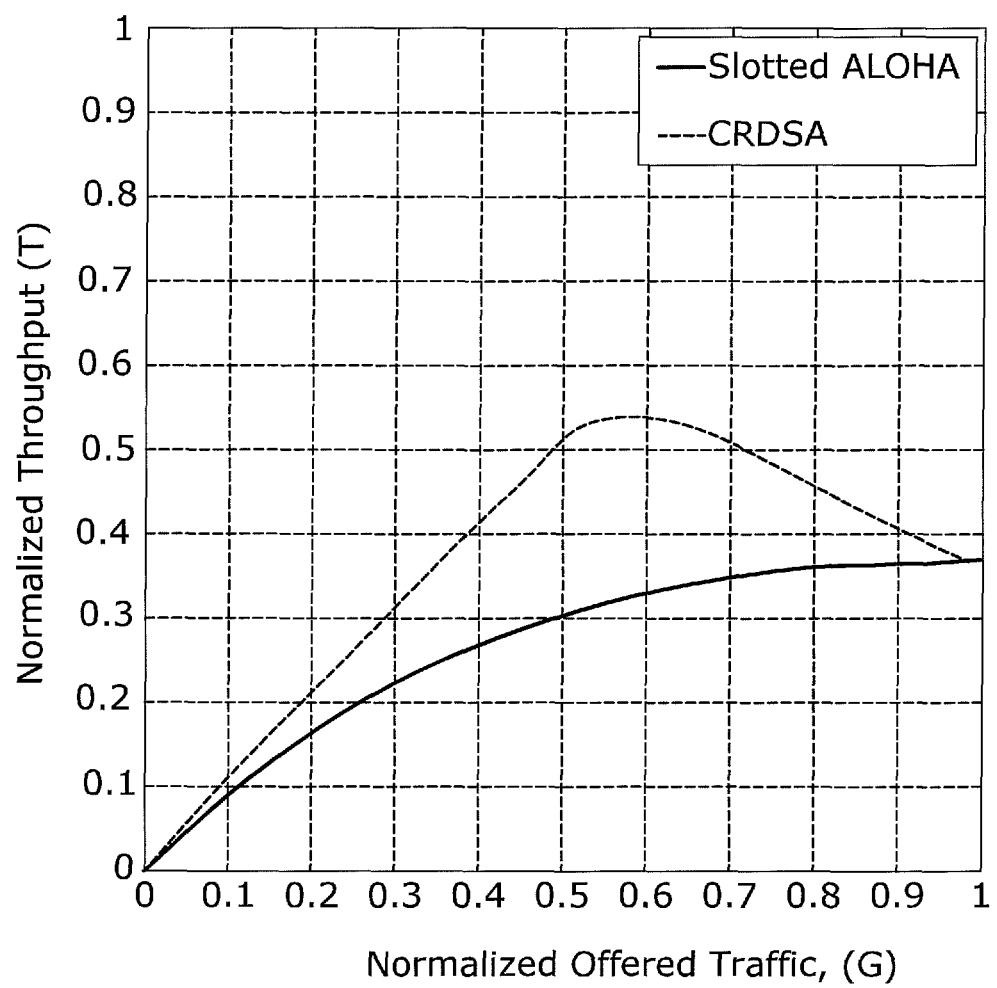
Figure 7:
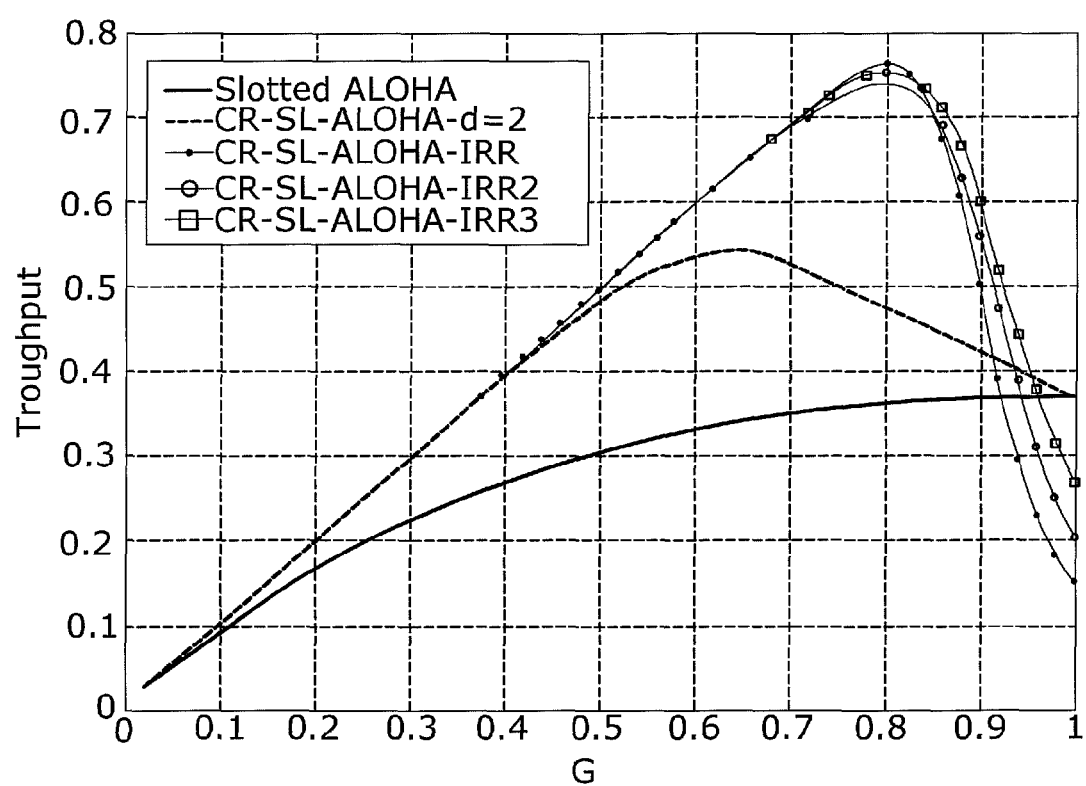
FIG. 7 shows a comparison of throughput T for the Slotted ALOHA method, the CRDSA method and the CRDSA method with a variable number of copies according to the invention. This method according to the invention will also be referred to as "irregular CRDSA". The curve for the Slotted ALOHA and the CRDSA method correspond to the curves of FIG. 6. For the irregular CRDSA method according to the invention three curves are shown in FIG. 7. The curve for IRR corresponds to a probability distribution of $\Lambda_2$=0.5, $\Lambda_3$=0.3 and $\Lambda_{11}$=0.2. IRR2 corresponds to a probability distribution of $\Lambda_2$=0.55171324726509, $\Lambda_3$=0.19685995978619, $\Lambda_5$=0.12194471081855, $\Lambda_6$=0.025602634567249, $\Lambda_{10}=0.013328273864425$, $\Lambda_{11}=0.050557382691191$,
$\Lambda_{26}=0.029375117837\,147$, $\Lambda_{100}=0.010618673170163$.
Figure 8:
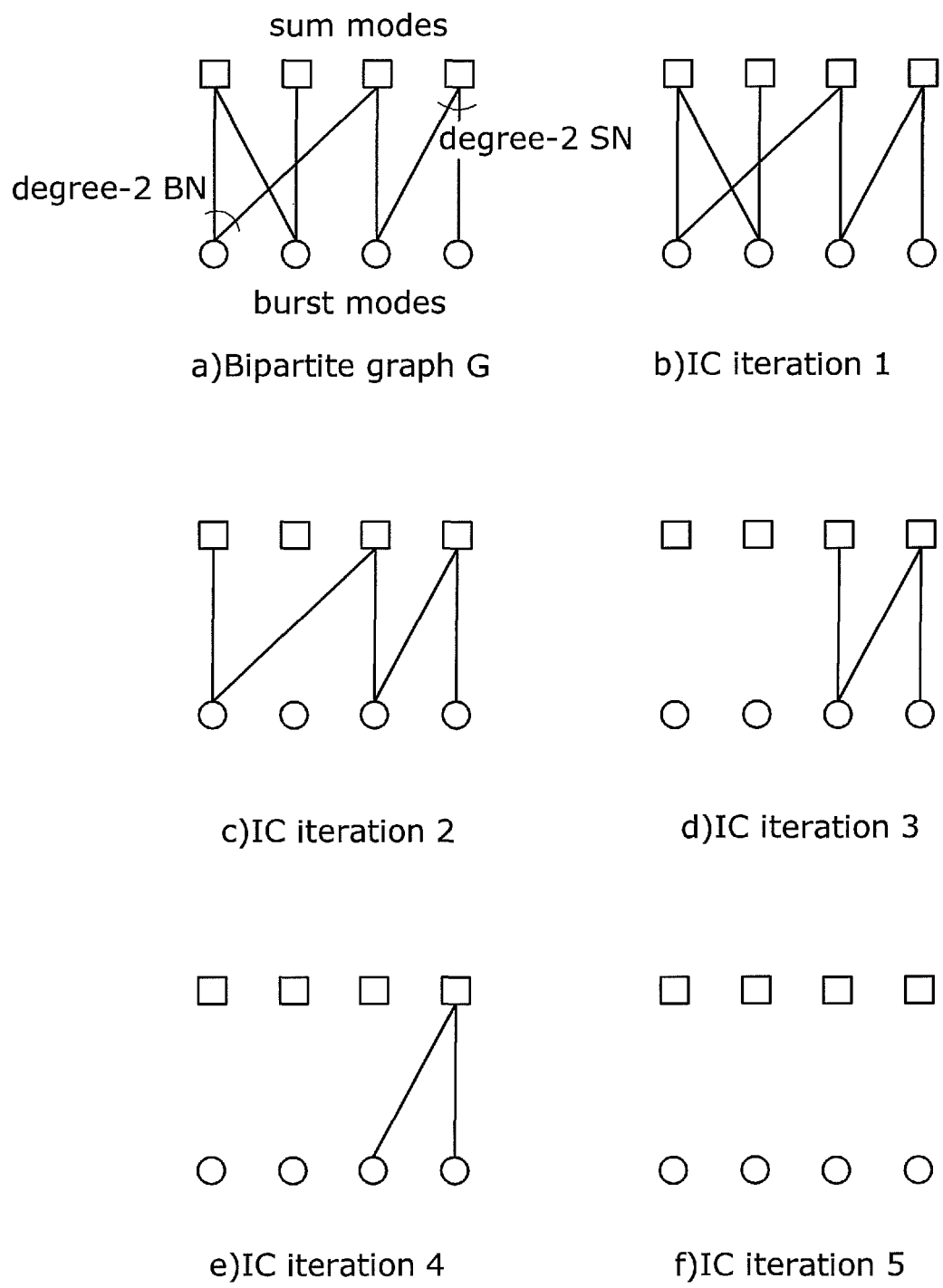

It is now convenient to introduce a graph representation of the IC process underlying the approach proposed in the state of the art document Casini et al. The following description will refer to a MAC frame composed by n slots, in which m burst transmissions take place. Each burst is repeated several times within the MAC frame. The status of the MAC frame can be described by a bipartite graph, whose representation is straightforward. The bipartite graph G=(B, S, E) as shown in FIG. 8 consists of a set B of m burst nodes (one for each burst that is transmitted within the MAC frame), a set S of n sum nodes (one for each slot, and thus referred to also as slot nodes), and a set E of edges. An edge connects a burst node (BN) $b_i \in B$ to a sum node (SN) $s_j \in S$ if and only if a replica of the i-th burst is transmitted in the j-th slot. Loosely speaking, burst nodes correspond to bursts and sum nodes correspond to slots. Similarly, each edge corresponds to a burst replica. Therefore, a burst which is replicated d times will be represented by a BN with d neighbors (i.e. a BN from which d edges emanate). Similarly, a slot where d replicas collide will correspond to a SN with d connections. As an example the bipartite graph representing a MAC frame made by n=4 slots where m=4 transmission attempts take place is depicted in FIG. 8(a). Here, squares denote sum nodes, while circles denote burst nodes. In the following the description will refer to the number of edges connected to a node as the node degree (e.g., a degree-d variable node represents a burst replicated d times). For the special case of the state of the art document Casini et al.[2], all burst nodes possess degree 2, while the sum node degrees may vary.

Assuming perfect channel estimation and a sufficiently-high signal-to-noise ratio as in the state of the art document Casini et al., the IC process can be represented through a message-passing along the edges of the graph. Each edge is labeled with a '1' if the corresponding burst replica has been revealed. Otherwise, the edge will be labeled as '0'. A burst replica can be revealed (i.e., the corresponding edge label is set to '1') by two means, i.e.

The burst replica has been successfully decoded in the corresponding slot. This is possible if all the other burst replica contributions (colliding in the same slot) have been removed.

The corresponding burst has been recovered, since a recovered burst permits to reveal all its replicas.

In FIG. 8(b), the iterative IC process starts by decoding the second burst. This is possible since the burst is received without collisions during the second slot (note that the degree of the second SN is 1). The contribution of the second burst can be then removed from the slots where its replicas were transmitted (the first slot, in this example). The revealed edges (i.e., the edges labeled as '1') are then removed from the graph. During the second iteration (FIG. 8(c)), we look for sum nodes with residual degree 1. Those nodes represent the slots where, after the first IC round, cleaned bursts can be detected. The only degree-1 SN in FIG. 8(c) is the first one, from which it is possible to recover the first burst. Its contribution into the third slot is then removed (FIG. 8(d)). During the third iteration, $B_3$ is recovered. Accordingly the edge connecting $B_3$ to $S_4$ is revealed. The contribution of the third burst into the fourth slot is then canceled, allowing the decoding of the fourth burst (FIG. 8(e)).

Before generalizing the example above to describe the IC process, it is worth to introduce some further notation.

The concept of node-perspective degree distribution is now introduced. The burst node degree distribution is defined by $\{\Lambda_d\}$, where $\Lambda_d$ defines the probability that a burst node possesses d connections. The sum node degree distribution is given by $\{\psi_d\}$, where $\psi_d$ is the probability that a sum node possesses d connections. Polynomial representations of the node-perspective degree distributions are given by $$\Lambda(x) \triangleq \sum_d \Lambda_d x^d, \quad \Psi(x) \triangleq \sum_d \Psi_d x^d.$$

Note that the burst nodes degree distribution $\Lambda(x)$ is under full control of the system designer. Indeed, this is not the case for the sum nodes degree distribution $\psi(x)$. In other words, one can define what is the repetition rate probability distribution for the bursts. Clearly, there is no way to decide how many burst replicas would collide in each slot. It will be shown later that the sum node degree distribution is fully defined by the system load G and by the average burst repetition rate. The main scope of this application is to enhance the throughput of the MAC scheme by optimizing $\Lambda(x)$.

The average burst repetition rate is given by $\Sigma_d d\Lambda_d = \Lambda'(1)$, while the average number of collisions per burst is defined as $\Sigma_d d\Psi_d = \Psi'(1)$. It is easy to verify that $G = m/n = \Psi'(1)/\Lambda'(1)$. Degree distributions can be defined also from an edge perspective. We then define $\lambda_d$ as the probability that an edge is connected to a degree-d burst node. Similarly, $\rho_d$ defines the probability that an edge is connected to a sum node of degree d. It can be proved that $$\lambda_d = \frac{\Lambda_d d}{\sum_d \Lambda_d d}, \quad \rho_d = \frac{\Psi_d d}{\sum_d \Psi_d d}.$$

The polynomial representations of $\{\lambda_d\}$ and of $\{\rho_d\}$ are given by $$\lambda(x) \triangleq \sum_d \lambda_d x^{d-1}$$

and by $\rho(x) = \Sigma_d \rho_d x^{d-1}$. Note that $\lambda(x) = \Lambda'(x)/\Lambda'(1)$ and that $\rho(x) = \Psi'(x)/\Psi'(1)$.

While for the node-perspective degree distribution polynomials we associate the coefficients $(\Lambda_i, \Psi_i)$ to $x^i$, in the edge-perspective case the coefficients $(\lambda_i, \rho_i)$ are associated to the $x^{i-1}$ term. This peculiarity in the notation will give rise to a compact description of the IC process convergence.

In the following the iterative IC convergence analysis will be explained.

The bipartite graph representation of the IC process allows analyzing its iterative convergence properties. Consider now a degree-d burst node. Denote by q the probability that an edge is unknown, given that all the other d−1 edges have been revealed with probability 1−p during the previous iteration step. The edge will be revealed whenever at least one of the other edges has been revealed. Hence, $q = p^{d-1}$. In a similar manner, consider a sum node with degree d. We denote by p the probability that an edge is unknown, given that all the other d−1 edges have been revealed with probability 1−q during the previous iteration step. The edge will be revealed whenever all the other edges have been revealed. Hence, $p = 1-(1-q)^{d-1}$. According to the tree analysis argument of Luby et all., by averaging these two expressions over the edge distributions, the evolution of the average erasure probabilities during the i-th iteration can be derived as $$q_i = \sum_d \lambda_d p_{i-1}^{d-1} = \lambda(p_{i-1}) \quad (1)$$

and $$p_i = \sum_d \rho_d (1-(1-q_i)^{d-1}) = 1-\rho(1-q_i), \quad (2)$$

where the subscript of p, q denotes the iteration index that, for sake of simplicity, will be omitted in the rest of the application. By iterating those equations for a given amount of times ($I_{max}$), one can actually analyze the iterative convergence of the IC process. Note that the initial condition has to be set as $q_0 = p_0 = 1$, i.e., there are no revealed edges at the beginning of the IC procedure. According to (2), at the first iteration p will take the value given by the probability that an edge is not connected to a degree-1 sum node. In fact, degree-1 sum nodes (corresponding to slots where clean bursts are present) play a fundamental role in starting the iterative IC cancellation. It is important to remark that the recursion of the CRDSA method holds just if the messages exchanged along the edges of the graph are statistically independent. Thus, its accuracy is subject to the absence of loops in the bipartite graph (recall that loops introduce correlation in the evolution of the erasure probabilities). This assumption implies very large frame sizes ($n \to \infty$). The analysis presented next will refer to this asymptotic setting.

By fixing $\Lambda(x)$ (and hence $\lambda(x)$) as will be seen next, for each value of the offered traffic G the distribution $\rho(x)$ can be determined. For values of G below a certain threshold G*, the iterative IC will succeed with probability close to 1 (i.e., almost all the bursts will be recovered). Above the threshold G*, the procedure will fail with a probability bounded away from 0. Hence, we can define the threshold as the maximum value of G such that $$q > \lambda(1-\rho(1-q)), \forall q \in (0,1] \quad (3)$$

Thus it has to been looked for distributions $\Lambda(x)$ leading to an high threshold G*, thus allowing (in the asymptotic setting) error-free transmission for any offered traffic up to G*.

Now the Derivation of the Sum Nodes Distribution will be described:

For proceeding in the threshold evaluation for a given $\Lambda(x)$, $\rho(x)$ has to be derived. The probability that a sum node is of degree d is given by $$\Psi_d = \binom{m}{d}\left(\frac{\Psi'(1)}{m}\right)^d\left(1-\frac{\Psi'(1)}{m}\right)^{m-d}.$$

The edge-perspective sum nodes degree distribution results in $$\Psi(x) = \sum_d \binom{m}{d}\left(\frac{\Psi'(1)}{m}\right)^d\left(1-\frac{\Psi'(1)}{m}\right)^{m-d} x^d \quad (4)$$

$$= \left(1-\frac{\Psi'(1)}{m}(1-x)\right)^m.$$

By letting $m \to \infty$ (asymptotic setting), (4) can be simplified to $\Psi(x) = e^{\Psi'(1)(1-x)} = e^{-G\Lambda'(1)(1-x)}$. The edge-perspective sum nodes degree distribution is therefore given by $$\rho(x) = \frac{\Psi'(x)}{\Psi'(1)} = e^{-G\Lambda(1)(1-x)} \quad (5)$$

The threshold definition of (3) can be refined as the maximum value of G such that $$q > \lambda(1-e^{-qG\Lambda'(1)}), \forall q \in (0,1] \quad (6)$$

In the following some degree distribution examples together with the related (asymptotic) iterative IC convergence properties will be provided. We will refer to those with constant repetition rate d as d-regular distributions. The others will be referred as irregular degree distributions.

EXAMPLE 1

(Slotted ALOHA): The SA can be considered as a 1-regular distribution. For this peculiar case, no threshold can be derived since no iterative IC process takes place.

EXAMPLE 2

(CRDSA): The approach of the CRDSA method realizes a 2-regular distribution (i.e., $\Lambda(x)=x^2$). The threshold derived is $G^*=0.5$.

EXAMPLE 3

(Irregular Distribution $\Lambda_1(x)$). The irregular distribution proposed herein has been obtained limiting the repetition rates to the set {2, 3, 8}. The maximum degree has been fixed to 8 due to practical considerations, i.e. to limit the number of pointers in the burst header. The distribution is given by $\Lambda_1(x)=0.5\ x^2+0.28\ x^3+0.22\ x^8$, and the threshold is $G^*=0.938$. The irregular distribution optimization has been obtained by differential evolution as described in "R. Storn and K. Price—Differential evolution a simple and efficient heuristic for global optimization over continuous spaces—Journal of Global Optimization, vol. 11, no. 4, pp. 341-359, December 1997".

Figure 9:
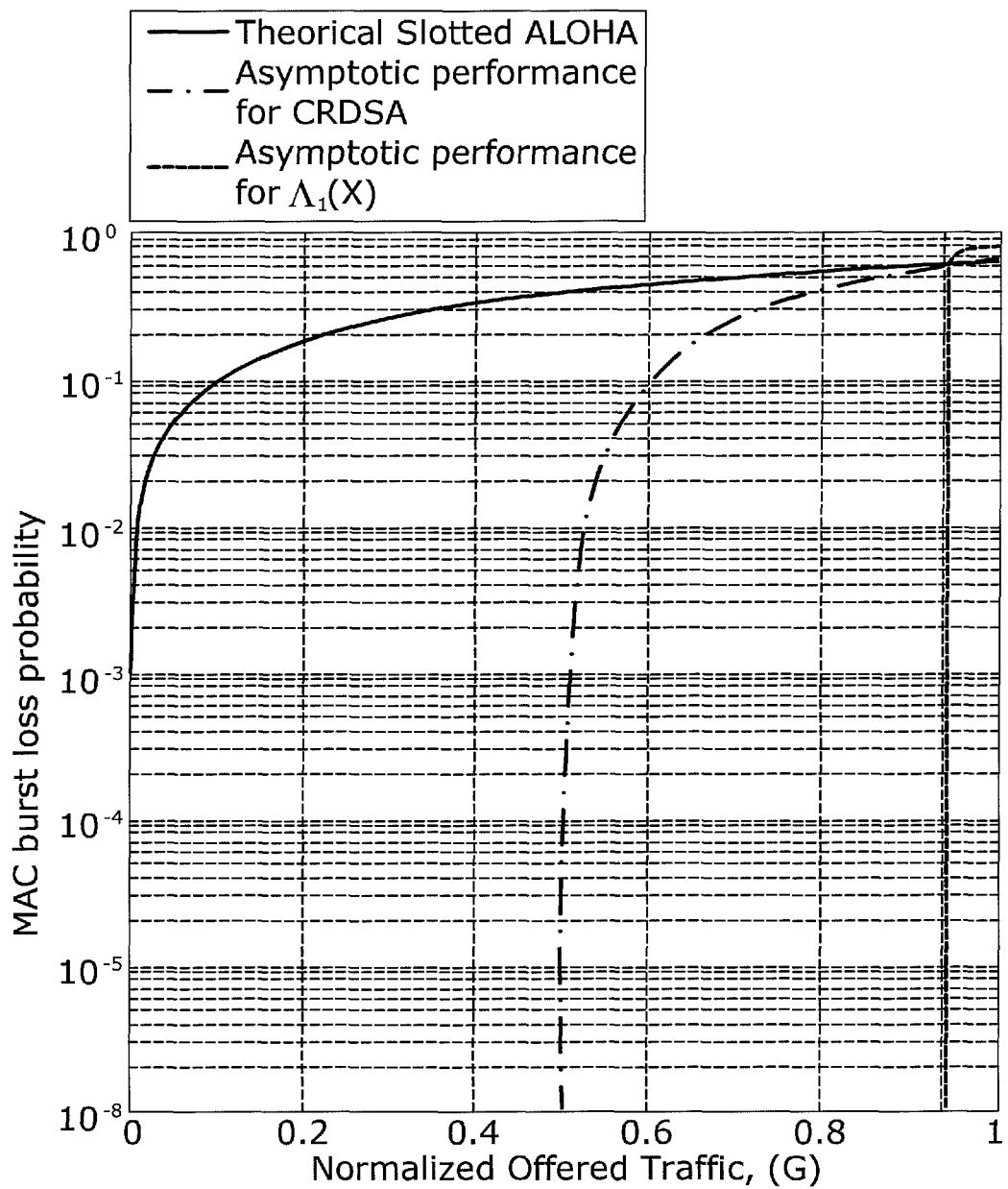

In FIG. 9, the asymptotic ($m \to \infty$) performance for the three distributions is presented. The comparison is in terms of MAC burst loss probability, $P_L$ (i.e., the probability that the transmission attempt is not successful) vs. the normalized offered traffic. The relation between throughput and MAC burst loss probability is given by $T(G)=G\ (1-P_L(G))$. The MAC burst loss probability has been obtained by iterating (for each value of G) equations (1) and (2) $I_{max}=1000$ times, and by setting $P_L=\Lambda(p)$. The large gain achievable by adopting the irregular distribution $\Lambda_i(x)$ appears evident in this asymptotic setting. According to the threshold definition, all the offered traffic for $G \leq G^*=0.938$ turns in useful throughput (i.e., the MAC burst loss probability is essentially zero). For the approach of Casini et al., this holds just for $G \leq 0.5$. Numerical results in the forthcoming section will confirm that, even considering rather small frames and a moderate amount of iterations, irregular distributions provide remarkable gains with respect to CRDSA.

A Simple Upper Bound to the Threshold will be described now:

Define now $$f(q) \triangleq \lambda(1 - \exp(-qG\Lambda'(1))).$$

A simple upper bound on the threshold can be obtained by observing that, for $q \to 0$ and for $G \leq G^*$, the derivative of $f(q)$ with respect to q must be less or equal than one, i.e. $f'(0) \leq 1$. This turns in $\Lambda'(0)\Lambda'(1)G = \lambda_2\Lambda'(1)G \leq 1$ and hence in the bound on the threshold given by $$G^* \leq \frac{1}{\lambda_2 \Lambda'(1)}. \tag{7}$$

Note that for the 2-regular distribution the actual threshold is determined by (7). A similar bound on the decoding threshold on an LDPC code over the binary erasure channel (referred as stability condition) was introduced in Richardson et al.

Next simulation results for the IC process of CRDSA will be presented. The simulation framework assumes ideal channel estimation and IC, taking into account both the analysis of Casini et al. and sufficiently-high signal-to-noise ratios.

Figure 10:
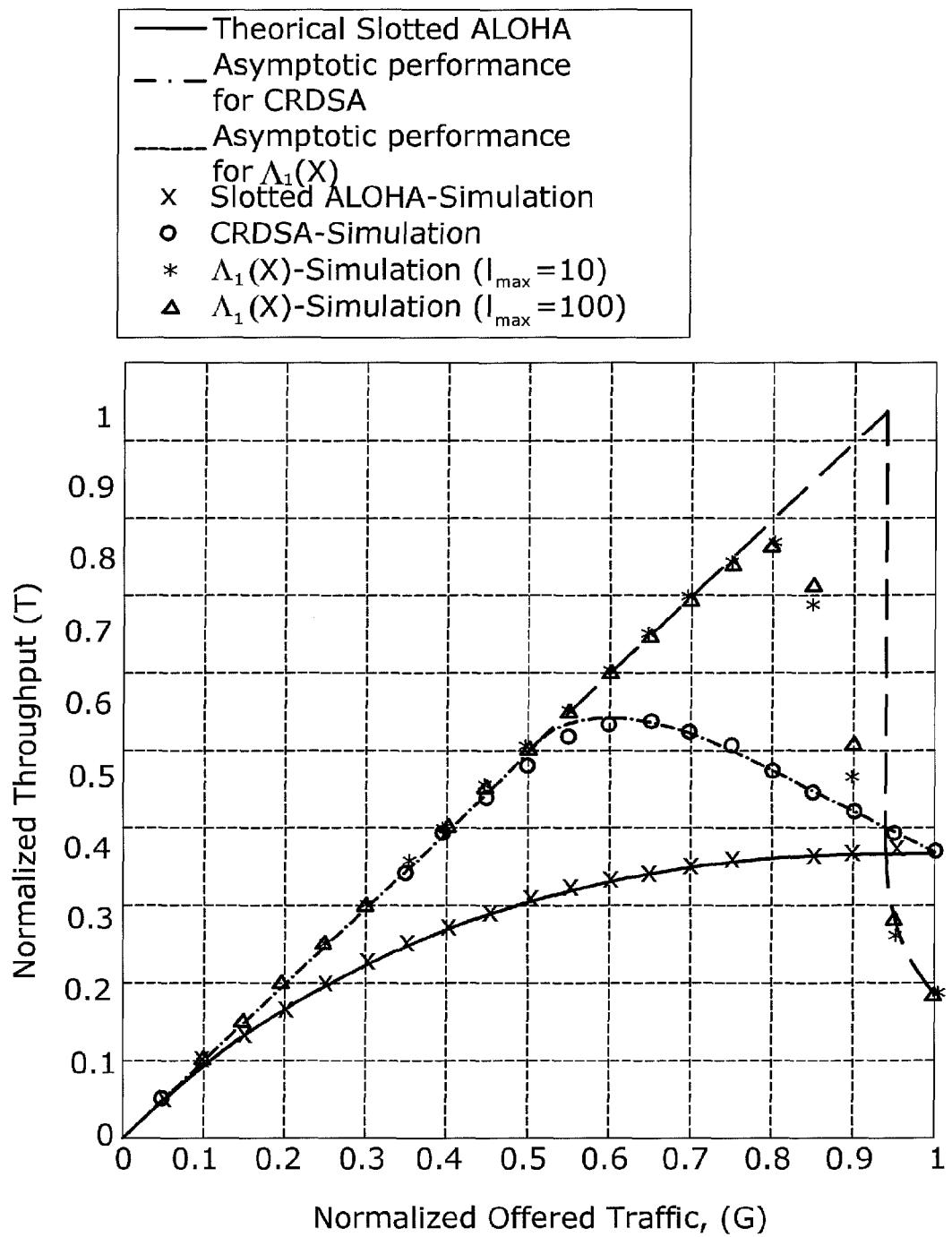

A first set of simulations have been carried out considering a fixed frame size of n=200 slots. The performance has been evaluated for a conventional SA system, for the CRDSA method and for the CRDSA enhanced by the adoption of the irregular distributions $\Lambda_1(x)$. For the three cases, theoretical curves are provided as well (FIG. 10). For SA, the reference curve is given by the well-known relation $T(G)=G \exp-G$, while for the others the asymptotic curves have been obtained by the iterative IC analysis. With $I_{max}=100$ iterations, the irregular scheme achieves a throughput which is close to 0.8, while the 2-regular distribution stops roughly at 0.55. Even by limiting the iteration count to $I_{max}=10$, the irregular distribution scheme shows just a small throughput degradation respect to the case of $I_{max}=100$. The relation throughput vs. offered traffic remains linear almost up T=0.7, meaning that up to such offered traffic values, almost all the offered traffic turns into throughput. The behavior of the irregular scheme when G approaches 1 deserves further comments. While for values of G that are quite below the threshold $G^*$ the advantage of CRDSA (in both its original regular setting and in the improved irregular one) with respect to pure SA is evident, at higher values of offered traffic SA performs better. Considering the example in FIG. 10, the irregular scheme plot crosses the SA one at $G \simeq 0.92$. This is due to the threshold phenomenon related to the iterative IC process. Namely, for $G<G^*$ the iterative burst recovery works well and most of the collisions are resolved. As $G>G^*$, the IC process gets stuck in an early stage, when number of burst replicas within the frame is much larger than the number of bursts of a SA scheme, resulting in a high MAC burst loss probability.

Figure 11:
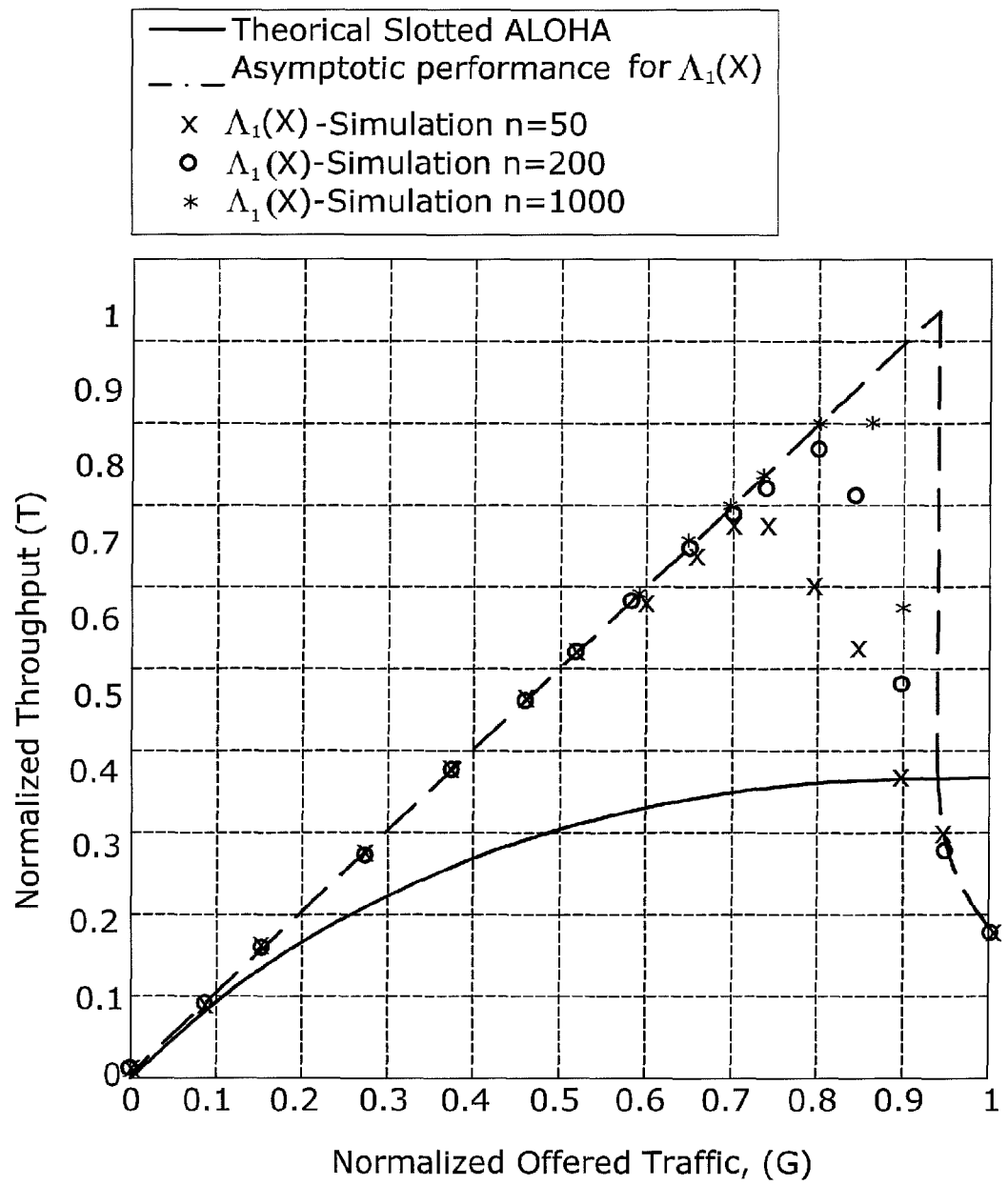

Further simulations have been carried out to investigate the role played by the frame size with respect to the performance. From the charts of FIG. 10, one can observe in fact that the actual performance with a frame of n=200 slots is far (for the irregular case) from those predicted by the iterative IC analysis. It seems that the asymptotic performance is obtained by letting the frame size grow indefinitely. This conjecture shares several aspects with the behavior of short codes with respect to the their asymptotic performance under iterative decoding, Richardson et al. A rough confirmation of this comes from the results provided in FIG. 11. Here, the performance of the irregular scheme using $\Lambda_1(x)$ are depicted, assuming 20 iterations, for different frame sizes n=50, 200, 1000. The chart shows that the scheme benefits from adopting longer MAC frames.

In this application, an enhancement of the SA approach for MAC has been introduced. The proposed approach represents a further improvement of the CRDSA scheme, allowing variable-rate burst repetition, according to a given probability distribution. It has been shown that by optimizing the choice of the probability distribution, large gains in terms of throughput may be achieved with respect to both conventional SA and CRDSA. A framework for the characterization and the optimization of the performance of the scheme as a function of the repetition rate probabilities has been introduced. The framework is based on a graph representation of the iterative IC process. Simulation results confirm the efficiency of the approach. A peak normalized throughput close to 0.8 has been observed by adopting a distribution with maximum repetition rate 8, with a MAC frame composed by 200 slots.

The comparisons carried out so far assume the same physical layer configuration (i.e., modulation and coding), the same peak power, and the same bandwidth for all the schemes. It is indeed clear that the systems employing CRDSA require in the average more power than those based on SA. This is due to the average number of packet transmissions required by the two systems, which is (by neglecting the retransmissions due to unresolvable collisions) 1 for SA, and $\Lambda'(1)$ in general for CRDSA. One shall then wonder how a SA system could take advantage by a transmitter power increased by $\Lambda'(1)$.

A fair way of using the additional power with SA goes in the direction of the shortening of the burst duration in the time domain. Denote the received power available for a burst when SA is used by $P_1$. Similarly denote by $P_2$ the power available for the 2-regular CRDSA scheme. Knowing that in the latter case a packet is transmitted in the average $\Lambda'(1)=2$ times, and assuming equal average power consumption for the two types of terminals, it is clear that $P_1=2 \cdot P_2$. For SA the power would then be concentrated in one burst, while for CRDSA it is spread over time. Suppose moreover that the transmission takes place on a Gaussian channel, and that the physical layer rate coincides with the capacity limit, $C=\log_2(1+P/N)$, where N is the noise power. The rate at which CRDSA would operate is then given by $C_2=\log_2(1\ P_2/N)$, while for SA $C_1=\log_2(1+2P_2/N)$. Define now $\eta=C_1/C_2$. The burst duration with SA could then be scaled by a factor $\eta$ with respect to the burst duration with CRDSA, if the same power consumption is assumed. This would lead again to a frame size enlargement (in terms of slots), $n_1 \approx n_2\eta$, thus to a lower MAC burst loss probability.

Figure 12:
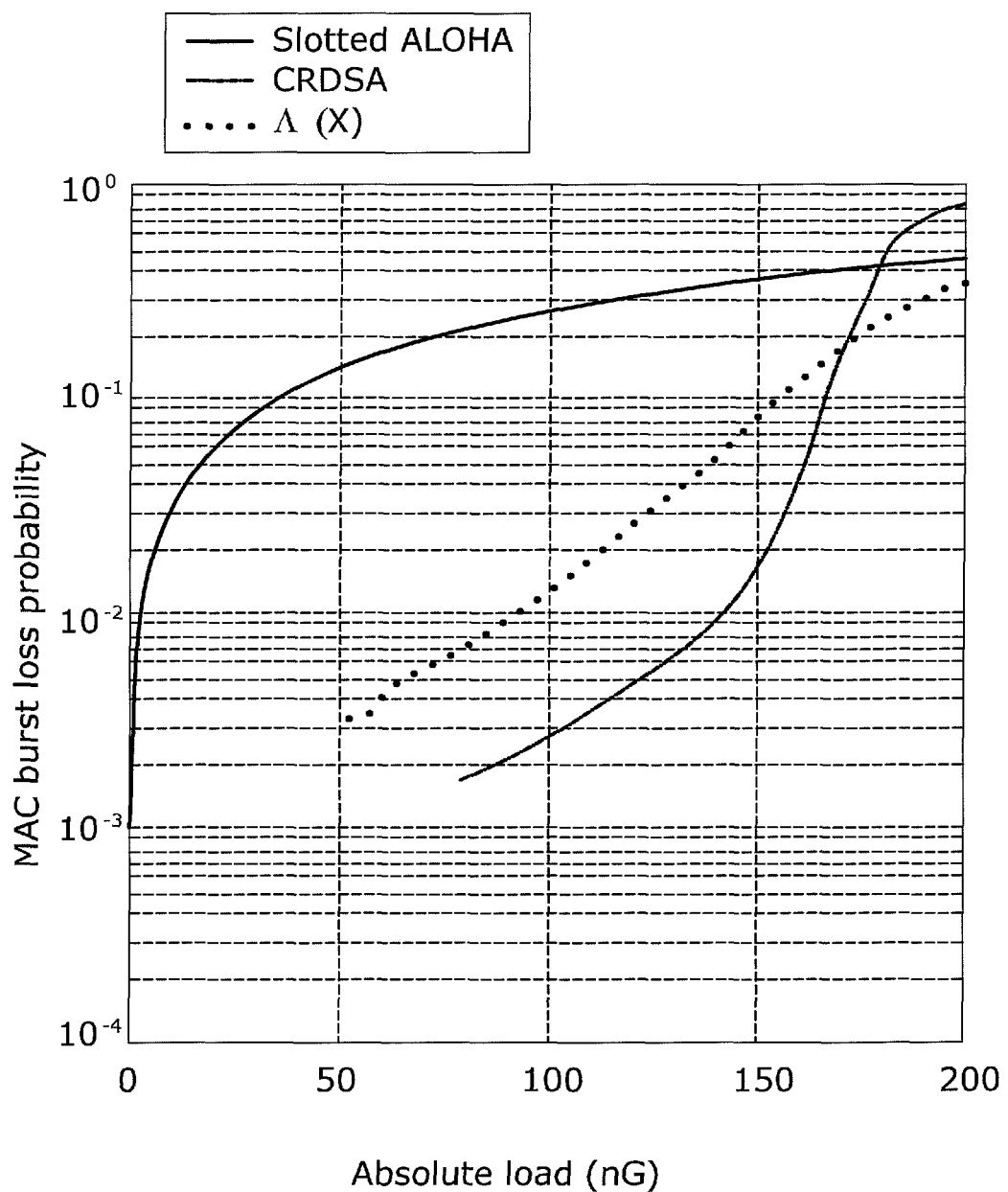

Consider the example of the distributions described above. Consider also a reference frame size of $n_{irr}=200$, referred to the enhanced irregular distribution case with $\Lambda(x)=\Lambda_1(x)$. Suppose moreover that (still for the irregular distribution case) the power is set to $P_{irr}=6$ dB. The average number of burst replicas is 1 for SA, 2 for the 2-regular distribution and $\Lambda'(1)=3.6$ for the irregular distribution. The power available then for the 2-regular case is $P_2=1.8 \cdot P_{irr}=8.55$ dB, while for the SA case $P_1=3.6 \cdot P_{irr}=11.55$ dB. The resulting scaling factors for the time domain durations of the bursts are for the 2-regular case $\eta_2=1.3074$ and for the SA case $\eta_1=1.6990$. This results in the corresponding scaled frame sizes $n_2=261$ and $n_1=340$. By simulating the performance of the three schemes in terms of MAC burst loss probability vs. absolute traffic (FIG. 12), the advantage of the irregular distribution, even if reduced, is still visible.

The invention claimed is:

1. Method of transmitting data, whereby a transmission channel towards an access point (10) is shared among a plurality of users (12), the data being transmitted using the Contention Resolution Diversity Slotted ALOHA (CRDSA) method, characterized by the steps:
varying the number of copies (14a, 14b, 14c; 16a, 16b, 16c; 18a, 18b, 18c) of a data packet (14, 16, 18) transmitted by a user (12) within one frame, and
characterized in that the number of copies of a data packet within one frame is varied separately for each data packet according to a given distribution ($\Lambda_d$) whereby ($\Lambda_d$) is the probability of generating (d) copies of a data packet within one frame, whereby for a large number of transmission attempts (m) per frame, the number of copies will get closer to the given probability distribution whereby for m $=\infty$ the number of copies corresponds to the probability distribution ($\Lambda_d$).

2. A method according to claim 1, characterized in that the Slotted ALOHA method is used instead of the Contention Resolution Diversity Slotted ALOHA method when the traffic is G>1 in particular G>0.92, whereby G is the number of packet transmission attempts (m) per frame divided by the number of slots (n) per frame.

3. A method according to claim 1, characterized in that the probability that (d) data packets are transmitted in the same slot is defined as ($\Psi_d$), whereby ($\Psi_d$) particularly depends from (G) and ($\Lambda_d$).

4. A method according to claim 1, characterized in that the Contention Resolution Diversity Slotted ALOHA method with a varying number of data packets within one frame is applied iteratively, iteration taking place preferably 10, 20, 100 or 1000 times.

5. A method according to claim 1, characterized in that ($\Lambda_2$)=0.5, ($\Lambda_3$)=0.28 and ($\Lambda_8$)=0.22.

6. A method according to claim 1, characterized by the step:
increasing the number of slots (n) per frame to 50,200 or preferably 1000.

7. A method according to claim 1, characterized in that the average number of copies of a data packet is 3.6.

8. A method according to claim 1, characterized by the step:
shortening the burst duration of a data packet in the time domain when the Slotted ALOHA method is used.

9. A method according to claim 8, characterized in that the shortening of the burst duration leads to an increased number of slots within one frame.

10. A method according to claim 9, characterized in that $n_2=n_{irr} \cdot \eta_2$ for d=2 and $n_1=n_{irr} \cdot \eta_1$ for the Slotted ALOHA method, whereby preferably ($\eta_2$)=1.3074 and ($\eta_1$)=1.6990 and ($n_{irr}$) is defined as the number of slots per frame for d>2.

11. A method according to claim 9, characterized in that ($n_{irr}$)=200, ($n_1$)=340 and ($n_2$)=261.

* * * * *